March 4, 1941.  R. MAUTSCH  2,234,127
PROCESS OF MANUFACTURE OF A METALLURGICAL PRODUCT INTENDED
TO BE MELTED FOR FORMING A METAL OR AN ALLOY
Filed Dec. 14, 1937
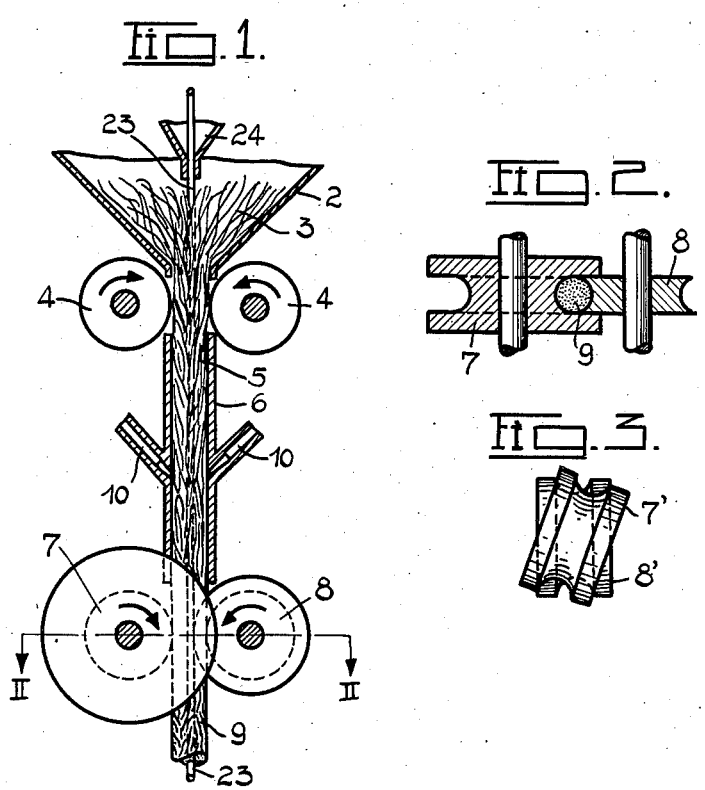
INVENTOR
ROBERT MAUTSCH
BY Young, Emery & Thompson
ATTYS.

Patented Mar. 4, 1941

2,234,127

UNITED STATES PATENT OFFICE 2,234,127

PROCESS OF MANUFACTURE OF A METALLURGICAL PRODUCT INTENDED TO BE MELTED FOR FORMING A METAL OR AN ALLOY

Robert Mautsch, Brussels, Belgium

Application December 14, 1937, Serial No. 179,788
In Germany December 24, 1936

4 Claims. (Cl. 75—0.5)

The present invention relates to a metallurgical product intended to be melted to form a metal or an alloy, and substantially comprising metallic elements united by compression.

It is known to compress scrap into bundles in order to facilitate the introduction of such scrap into the furnaces where it is to be melted. These bundles of scrap are formed of metallic elements of very different natures and dimensions, and due to that fact do not possess the same composition nor the same compactness in any cross-section. Their electrical conductivity may likewise vary very considerably from one cross-section to another. Apart from the facility which they offer for their introduction into the melting furnaces, these bundles of scrap do not in said furnaces afford any advantage over scrap thrown in uncompressed. The composition of the molten metal therefore remains subject to variations.

The present invention relates to a metallurgical product intended to be employed as starting material for the easy production by fusion of metals or of alloys which have regularly to possess a well-determined composition throughout their entire mass.

The metallurgical product according to the invention is produced by the compression of metallic fibres having practically the same cross-section throughout their entire length and distributed in a practically uniform manner throughout the entire length of said product.

This product therefore consists of a very intimate physical mixture of its different constituents in a very finely divided state. Despite this state of division, the product is very rigid and is not deteriorated by ordinary manipulations, even when it is in the form of thin rods.

Due to the regularity of the fibres, the compactness of the metallurgical product according to the invention is in addition the same in any cross-section whatsoever. Furthermore, due to its high compactness and the continuity of its fibres, said product conducts electric current almost as well as a solid conductor having the same cross-section as the product and having the same composition as the fibres forming the product. This high electric conductivity represents a very important advantage when the fusion of the product is to be effected electrically and above all when the product is utilised as electrode for electric arc welding by hand.

For producing a metallurgical product according to the invention, the fibres are advantageously subjected to a preliminary compression before introducing them into the press intended to compress them to the desired degree.

Preferably, use is made of continuous output presses consisting of rolls, driven like the rolls of rolling mills.

With a view to increasing the rigidity of the compressed product, a twisting movement may be imparted to the whole of the constituent fibres of the product during the compression of the latter.

The invention finally relates to a process for the manufacture of metallic products, particularly alloys, by fusion, wherein the elements united by compression are melted.

In the process according to the invention, the starting materials employed are metallurgical products produced by the compression of metallic fibres, having practically the same cross-section throughout their entire length and distributed in a practically uniform manner throughout the entire length of said products.

According to an advantageous modification, in a sequence of continuous operations, the compression of the metallic fibres is first effected to form continuous metal rods of any desired profile, and said rods are then introduced into a melting furnace in which they are fused and from which the molten bath is cast.

According to another advantageous modification, the aforesaid metallurgical products are employed as feeding metal for welding.

Other features and details of the invention will appear in the course of the description of the accompanying drawing representing diagrammatically and merely by way of example some constructions of the invention.

Figure 1 represents diagrammatically a method of producing the metallurgical products according to the invention.

Figure 2 is a diametrical section on the line II—II of Figure 1.

Figure 3 represents a press for effecting a twisting of the whole of the fibres at the same time as a compression thereof.

In these various figures, the same reference numerals denote the same parts.

For producing a metallurgical product according to the invention, metallic fibres 3 such as those produced by the planing of sheet metal and commonly employed for the scouring of articles are introduced into a hopper 3. Said metallic fibres are in the form of long, fine elements having practically the same cross-section throughout their entire length. When they have been united into a mass, said elements appear like a bundle of hay. Such a mass may also be compared with a ball of cotton or wool, the fibres of which would obviously be much coarser. According to whether these fibres are more or less coarse, they are commonly termed "iron fibre" or "iron wool." Due to the fact that the fibres are interlaced to a considerable extent when compressed, a rigid agglomerate is obtained without the use of a binding agent and without the use of an excessive pressure. In this agglomerate, therefore, the fibres are distributed in a practically uniform manner throughout its entire length.

The mass of fibres 3 is drawn from the hopper 2 by rolls which subject said mass to a preliminary compression. The cylinder 5 thus formed is guided in a tube 6 towards a second continuous press comprising rolls 7 and 8 (Figures 1 and 2) similar to the rolls of rolling mills.

The cylinder 5 is compressed powerfully between these rolls and leaves the latter in the form of an agglomerated rod 9 according to the invention. Experience shows that it is possible in this way, even in the cold and without any binding agent, to produce a very rigid agglomerate of close texture.

Of course, it is not excluded to assist agglomeration by the use of binding agents or chemical or physical means, such as heat.

The metallurgical product according to the invention may obviously comprise substances other than metallic fibres. More particularly it may comprise metals in powder form or any other added substances, the presence of which either in or above the molten metal to be obtained may be indispensable or even simply advantageous.

More particularly, it is possible to introduce the added materials between two compressions to which the fibres are subjected. In particular, this addition may be effected by blowing or injecting powder between the fibres through nozzles 10.

In certain cases, it may be of advantage to localise the added materials on the surface of the agglomerates by adding said materials at the entry to the second press.

The rigidity of the agglomerate according to the invention may likewise be enhanced by imparting a twisting movement to the whole of its fibres during the compression of the latter. For effecting this twisting, it is merely necessary, instead of directing the axes of the compressing rolls parallel as shown in Figure 2, to cause the axes of said rolls to make a small angle as shown in Figure 3 for the rolls 7' and 8'.

It is likewise possible to introduce into each agglomerate one or more continuous metal wires of suitable nature. The continuous metal wires may be introduced into the mass of the fibres in order to obtain particularly regular, low-percentage proportions of certain additions. All the materials, metallic and otherwise, entering into the composition of the agglomerate to be melted are thus extremely divided and intimately mixed, which assists their combination at the moment of fusion.

The wires are introduced into the mass of fibres for example as shown in Figure 1. The wire 23 shown is guided in the axis of the hopper 2 by another hopper 24. Each press may likewise be fed with a ribbon or cylinder of metallic fibres which have undergone a preliminary compression in a press not shown.

The metallurgical products according to the invention may be utilised advantageously as electrodes in an electric melting furnace, such as an electric arc furnace. In this case, it is advantageous to effect in a sequence of continuous operations first the compression of the metallic fibres in the form of continuous rods of any desired profile, then the introduction of said rods into the furnace in which they are melted and from which the molten bath is cast.

Of course, in principle, the charge of a melting furnace may be introduced in a continuous manner in the form of agglomerated rods according to the invention, also in the case in which the furnace, instead of being heated electrically, is heated in some other way, for example by gas.

Another advantageous application of the metallic agglomerates according to the invention is represented by welding rods.

Welding rods containing metals such as nickel, chromium, vanadium and so forth are relatively expensive, particularly on account of the difficulties of their manufacture. These welding rods may advantageously be replaced by metallic agglomerates according to the invention, since the said rods may be made of metallic fibres to which the special metals required are added in the form of powder or in any other form.

Alloying of these different metals is effected during the melting of the welding rod. They are therefore obtained without the necessity of rolling or drawing them.

What I claim is:

1. A process of manufacture of a metallurgical product intended to be melted for forming a metal or an alloy, comprising subjecting to a preliminary compression metallic fibres having practically the same cross-section throughout their entire length and distributed in a practically uniform manner throughout the entire length of said product, adding materials between the metallic fibres of the semi-compressed product so obtained, and passing afterwards this semi-compressed product through a press for compressing it to the final desired degree.

2. A process of manufacture of a metallurgical product intended to be melted for forming a metal or an alloy, comprising subjecting to a preliminary compression metallic fibres having practically the same cross-section throughout their entire length and distributed in a practically uniform manner throughout the entire length of said product, blowing materials in powder form into the mass of fibres of the semi-compressed product so obtained, and passing afterwards this semi-compressed product through a press for compressing it to the final desired degree.

3. A process of manufacture of a metallurgical product intended to be melted for forming a metal or an alloy, comprising subjecting to a preliminary compression metallic fibres having practically the same cross-section throughout their entire length and distributed in a practically uniform manner throughout the entire length of said product, adding materials between the metallic fibres at the periphery of the semi-compressed product so obtained, and passing afterwards this semi-compressed product through a press for compresing it to the final desired degree.

4. A process of manufacture of a metallurgical product intended to be melted for forming a metal or an alloy, comprising subjecting to a preliminary compression metallic fibres having practically the same cross-section throughout their entire length and distributed in a practically uniform manner throughout the entire length of said product, passing afterwards the semi-compressed product so obtained through a press for compressing it to the final desired degree, and imparting a twisting movement to the whole of the constituent fibres of the product during the final compression.

ROBERT MAUTSCH.